US010766305B2

(12) United States Patent
Kunisawa

(10) Patent No.: US 10,766,305 B2
(45) Date of Patent: Sep. 8, 2020

(54) PNEUMATIC TIRE

(71) Applicant: SUMITOMO RUBBER INDUSTRIES, LTD., Kobe-shi, Hyogo (JP)

(72) Inventor: Tetsuya Kunisawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 280 days.

(21) Appl. No.: 15/532,435

(22) PCT Filed: Nov. 17, 2015

(86) PCT No.: PCT/JP2015/082174
§ 371 (c)(1),
(2) Date: Jun. 1, 2017

(87) PCT Pub. No.: WO2016/098505
PCT Pub. Date: Jun. 23, 2016

(65) Prior Publication Data
US 2017/0267027 A1 Sep. 21, 2017

(30) Foreign Application Priority Data

Dec. 16, 2014 (JP) ................................. 2014-254213

(51) Int. Cl.
B60C 1/00 (2006.01)
C08K 3/36 (2006.01)
B60C 11/00 (2006.01)
C08L 21/00 (2006.01)
C08L 9/06 (2006.01)

(52) U.S. Cl.
CPC .............. B60C 1/0016 (2013.01); B60C 1/00 (2013.01); B60C 11/00 (2013.01); C08K 3/36 (2013.01); C08L 9/06 (2013.01); C08L 21/00 (2013.01); B60C 2200/04 (2013.01)

(58) Field of Classification Search
CPC .................................................. B60C 1/0016
See application file for complete search history.

(56) References Cited

U.S. PATENT DOCUMENTS

| | | | | |
|---|---|---|---|---|
| 5,684,073 A * | 11/1997 | Midorikawa | ......... | B60C 1/0016 |
| | | | | 524/254 |
| 5,916,956 A * | 6/1999 | Wang | ....................... | C08J 3/226 |
| | | | | 521/134 |
| 6,084,015 A * | 7/2000 | Chino | ....................... | B60C 1/00 |
| | | | | 524/189 |
| 6,291,572 B1 * | 9/2001 | Brown | ..................... | C08J 3/226 |
| | | | | 523/351 |
| 8,865,803 B2 | 10/2014 | Miyazaki | .................. | B60C 1/00 |
| | | | | 152/450 |
| 2004/0014876 A1 * | 1/2004 | Ichikawa | .................. | C08C 1/04 |
| | | | | 524/575.5 |
| 2007/0287774 A1 * | 12/2007 | Crutchley | ............. | B60C 1/0016 |
| | | | | 523/351 |
| 2008/0009588 A1 * | 1/2008 | Iketani | ..................... | C08L 23/16 |
| | | | | 525/192 |
| 2008/0021145 A1 * | 1/2008 | Iketani | .................... | C08L 23/16 |
| | | | | 524/430 |
| 2010/0036019 A1 * | 2/2010 | Miyazaki | ............... | B60C 1/0016 |
| | | | | 523/157 |
| 2010/0108213 A1 * | 5/2010 | Miyazaki | .................. | B60C 1/00 |
| | | | | 152/209.5 |
| 2010/0204372 A1 * | 8/2010 | Miyazaki | .............. | B60C 1/0016 |
| | | | | 524/104 |
| 2011/0230593 A1 * | 9/2011 | Kondo | .................. | B60C 1/0016 |
| | | | | 523/156 |
| 2012/0053263 A1 * | 3/2012 | Miyazaki | ................. | C08K 3/34 |
| | | | | 523/156 |
| 2013/0158191 A1 | 6/2013 | Colvin et al. | | |
| 2013/0331498 A1 * | 12/2013 | Miyazaki | .............. | B60C 1/0016 |
| | | | | 524/493 |
| 2014/0144566 A1 * | 5/2014 | Miyazaki | .............. | B60C 1/0016 |
| | | | | 152/525 |
| 2014/0155521 A1 * | 6/2014 | Miyazaki | ................. | C08K 3/06 |
| | | | | 523/156 |
| 2014/0213714 A1 * | 7/2014 | Ono | ....................... | B60C 1/0016 |
| | | | | 524/492 |
| 2014/0275331 A1 * | 9/2014 | Kondo | ..................... | C08L 7/00 |
| | | | | 523/156 |
| 2015/0353657 A1 | 12/2015 | Yukimura et al. | | |

(Continued)

FOREIGN PATENT DOCUMENTS

CN 101100532 A 1/2008
CN 101643004 A 2/2010
(Continued)

OTHER PUBLICATIONS

Machine Translation of JP-11181155-A, 2019 (Year: 2019).*
Machine translation of JP-60250051-A, 2019 (Year: 2019).*
International Search Report for PCT/JP2015/082174 (PCT/ISA/210) dated Feb. 16, 2016.
Written Opinion of the International Searching Authority for PCT/JP2015/082174 (PCT/ISA/237) dated Feb. 16, 2016.
Machine translation of JP-2001-329118-A published dated Nov. 27, 2001.
Machine translation of JP-2008-255167-A published dated Oct. 23, 2008.
Machine translation of JP-2011-122024-A published dated Jun. 23, 2011.

(Continued)

Primary Examiner — Liam J Heincer
(74) Attorney, Agent, or Firm — Birch, Stewart, Kolasch & Birch, LLP

(57) ABSTRACT

The present invention provides a pneumatic tire that achieves a balanced improvement in fuel economy, wet grip performance, handling stability, abrasion resistance, fatigue resistance, and tensile strength. The present invention relates to a pneumatic tire including a tread formed from a rubber composition, the rubber composition having after vulcanization rubber properties satisfying certain values.

18 Claims, No Drawings

(56) References Cited

U.S. PATENT DOCUMENTS

| | | | |
|---|---|---|---|
| 2016/0046781 A1 | 2/2016 | Miyazaki | |
| 2016/0090474 A1* | 3/2016 | Sato | C08L 9/00 523/156 |
| 2016/0090475 A1* | 3/2016 | Nakatani | C08L 9/06 524/526 |
| 2016/0152792 A1* | 6/2016 | Kunisawa | C08L 21/00 524/493 |
| 2016/0200901 A1* | 7/2016 | Tsuchida | B60C 1/00 524/495 |
| 2016/0340501 A1* | 11/2016 | Miyazaki | B60C 1/0016 |
| 2017/0022298 A1* | 1/2017 | Sohn | C08F 36/04 |
| 2017/0369685 A1* | 12/2017 | Yamashiro | C08K 3/04 |
| 2018/0093529 A1* | 4/2018 | Kunisawa | C08K 3/013 |
| 2018/0163030 A1* | 6/2018 | Kamada | B60C 1/0016 |

FOREIGN PATENT DOCUMENTS

| | | |
|---|---|---|
| CN | 102199316 A | 9/2011 |
| EP | 2703186 A1 | 3/2014 |
| JP | 60250051 A * | 12/1985 |
| JP | 11181155 A * | 7/1999 |
| JP | 2001-329118 A | 11/2001 |
| JP | 3366452 B2 | 1/2003 |
| JP | 3366453 B2 | 1/2003 |
| JP | 2004-51856 A | 2/2004 |
| JP | 3745105 B2 | 2/2006 |
| JP | 2008-255167 A | 10/2008 |
| JP | 2009-102614 A | 5/2009 |
| JP | 2011-122024 A | 6/2011 |
| JP | 2011-213988 A | 10/2011 |
| JP | 2011-246685 A | 12/2011 |
| JP | 2013-166825 A | 8/2013 |
| JP | 2014-9300 A | 1/2014 |
| JP | 2014-198821 A | 10/2014 |
| WO | WO 2014/119691 A1 | 8/2014 |
| WO | WO 2014/178232 A1 | 11/2014 |

OTHER PUBLICATIONS

Machine translation of JP-2014-198821-A published dated Oct. 23, 2014.

Machine translation of JP-2014-9300-A published dated Jan. 20, 2014.

* cited by examiner

PNEUMATIC TIRE

TECHNICAL FIELD

The present invention relates to a pneumatic tire.

BACKGROUND ART

In view of the increase in concern about environmental issues as well as economic efficiency, the demand for fuel efficient automobiles has been increasing in recent years. A need also exists for automotive tires excellent in fuel economy. Fuel economy is improved by reducing the amount of filler such as silica or carbon black to reduce rolling resistance. However, this technique tends to reduce wet grip performance and abrasion resistance. Automotive tires are also required to have handling stability, fatigue resistance, and tensile strength. Therefore, there is a need for techniques that achieve a balanced improvement in fuel economy, wet grip performance, handling stability, abrasion resistance, fatigue resistance, and tensile strength.

The following methods have been proposed to date: a method of using an appropriate combination of a specific rubber component, silica, and inorganic powder such as aluminum hydroxide to simultaneously obtain performance on wet roads, abrasion resistance, and low heat build-up properties (see, for example, Patent Literature 1); a method of using an appropriate combination of a specific rubber component, a specific inorganic compound powder, and a specific carbon black to improve grip force on wet roads and semi-wet roads and workability (see, for example, Patent Literature 2); and a method of using an appropriate combination of a specific rubber component, a specific inorganic compound powder, a specific silica, and a specific carbon black to improve grip force on wet roads and semi-wet roads without impairing abrasion resistance (see, for example, Patent Literature 3). Unfortunately, these methods still leave room for improvement to achieve a balanced improvement in fuel economy, wet grip performance, handling stability, abrasion resistance, fatigue resistance, and tensile strength.

CITATION LIST

Patent Literature

Patent Literature 1: JP 3745105 B
Patent Literature 2: JP 3366452 B
Patent Literature 3: JP 3366453 B

SUMMARY OF INVENTION

Technical Problem

The present invention aims to solve the above problems and provide a pneumatic tire that achieves a balanced improvement in fuel economy, wet grip performance, handling stability, abrasion resistance, fatigue resistance, and tensile strength.

Solution to Problem

The present invention relates to a pneumatic tire, including a tread formed from a rubber composition, the rubber composition having after vulcanization rubber properties satisfying all the following relations (1) to (7):

$$(\tan \delta_1/\tan \delta_2) \geq 4.38 \quad (1)$$

$$(E^*/\tan \delta_2) \geq 21.88 \quad (2)$$

$$3.5 \leq E^* \leq 6.0 \quad (3)$$

$$\tan \delta_2 \leq 0.16 \quad (4)$$

$$\tan \delta_1 \geq 0.70 \quad (5)$$

$$EB \geq 600 \quad (6)$$

$$TB \times EB \geq 12000 \quad (7)$$

where $\tan \delta_1$ in relations (1) and (5) represents a tan δ at 0° C. determined by viscoelastic measurement at an initial strain of 10% and a dynamic strain of 5%;

$\tan \delta_2$ in relations (1), (2), and (4) represents a tan δ at 30° C. determined by viscoelastic measurement at an initial strain of 10% and a dynamic strain of 2%;

$E^*$ in relations (2) and (3) represents a dynamic elastic modulus ($E^*$(MPa)) at 30° C. determined by viscoelastic measurement at an initial strain of 10% and a dynamic strain of 2%;

EB in relations (6) and (7) represents a tensile elongation (EB (%)) determined in accordance with JIS K 6251; and TB in relation (7) represents a tensile strength at break (TB (MPa)) determined in accordance with JIS K 6251.

Preferably, the rubber properties after vulcanization of the rubber composition further satisfy the following relation (8):

$$57 \leq Hs \leq 67 \quad (8)$$

where Hs represents a hardness (Hs) at 23° C. determined in accordance with JIS K 6253.

The rubber composition preferably contains at least one silica.

Advantageous Effects of Invention

The pneumatic tire of the present invention includes a tread formed from a rubber composition which has after vulcanization rubber properties satisfying all the above relations (1) to (7). Such a pneumatic tire can achieve a balanced improvement in fuel economy, wet grip performance, handling stability, abrasion resistance, fatigue resistance, and tensile strength.

DESCRIPTION OF EMBODIMENTS

The pneumatic tire of the present invention includes a tread formed from a rubber composition. The rubber composition has after vulcanization rubber properties satisfying all the following relations (1) to (7):

$$(\tan \delta_1/\tan \delta_2) \geq 4.38 \quad (1)$$

$$(E^*/\tan \delta_2) \geq 21.88 \quad (2)$$

$$3.5 \leq E^* \leq 6.0 \quad (3)$$

$$\tan \delta_2 \leq 0.16 \quad (4)$$

$$\tan \delta_1 \geq 0.70 \quad (5)$$

$$EB \geq 600 \quad (6)$$

$$TB \times EB \geq 12000 \quad (7)$$

where $\tan \delta_1$ in relations (1) and (5) represents the tan δ at 0° C. determined by viscoelastic measurement at an initial strain of 10% and a dynamic strain of 5%;

tan $\delta_2$ in relations (1), (2), and (4) represents the tan $\delta$ at 30° C. determined by viscoelastic measurement at an initial strain of 10% and a dynamic strain of 2%;

E* in relations (2) and (3) represents the dynamic elastic modulus (E*(MPa)) at 30° C. determined by viscoelastic measurement at an initial strain of 10% and a dynamic strain of 2%;

EB in relations (6) and (7) represents the tensile elongation (EB (o)) determined in accordance with JIS K 6251; and TB in relation (7) represents the tensile strength at break (TB (MPa)) determined in accordance with JIS K 6251.

As above, by using in a tread a rubber composition having after vulcanization predetermined levels of tan $\delta$, E*, EB, and TB, it is possible to provide a pneumatic tire that achieves a balanced improvement in fuel economy, wet grip performance, handling stability, abrasion resistance, fatigue resistance, and tensile strength.

When the rubber composition in the present invention is vulcanized, the vulcanized rubber composition has a dynamic elastic modulus (E*(MPa)) at 30° C. of at least 3.5 but not more than 6.0 as determined by viscoelastic measurement at an initial strain of 10% and a dynamic strain of 2%. Namely, it satisfies the following relation (3).

$$3.5 \leq E^* \leq 6.0 \tag{3}$$

Due to such moderate rubber elasticity, good handling stability and good wet grip performance can be simultaneously achieved. The E* is preferably 3.6 or more, but preferably 5.8 or less, more preferably 5.5 or less.

The vulcanized rubber composition has a tan $\delta$ (tan $\delta_2$) at 30° C. of 0.16 or less as determined by viscoelastic measurement at an initial strain of 10% and a dynamic strain of 2%. Namely, it satisfies the following relation (4).

$$\tan \delta_2 \leq 0.16 \tag{4}$$

This leads to excellent fuel economy. The tan $\delta_2$ is preferably 0.155 or less, more preferably 0.150 or less, still more preferably 0.145 or less, particularly preferably 0.140 or less. The lower limit of the tan $\delta_2$ is not particularly limited, and lower tan $\delta_2$ is better.

The vulcanized rubber composition has a tan $\delta$ (tan $\delta_1$) at 0° C. of 0.70 or more as determined by viscoelastic measurement at an initial strain of 10% and a dynamic strain of 5%. Namely, it satisfies the following relation (5).

$$\tan \delta_1 \geq 0.70 \tag{5}$$

This leads to excellent wet grip performance. The tan $\delta_1$ is preferably 0.72 or more, more preferably 0.75 or more, still more preferably 0.80 or more. The upper limit of the tan $\delta_1$ is not particularly limited, and higher tan $\delta_1$ is better.

The vulcanized rubber composition further satisfies the following relation (1):

$$(\tan \delta_1 / \tan \delta_2) \geq 4.38 \tag{1}$$

where tan $\delta_1$ represents the tan $\delta$ at 0° C. determined by viscoelastic measurement at an initial strain of 10% and a dynamic strain of 5%, and tan $\delta_2$ represents the tan $\delta$ at 30° C. determined by viscoelastic measurement at an initial strain of 10% and a dynamic strain of 2%.

When the tan $\delta_1$ and tan $\delta_2$ satisfy relation (1), increased tan $\delta_1$ and reduced tan $\delta_2$ are obtained so that good fuel economy and good wet grip performance can be simultaneously achieved. The value of relation (1) is preferably 4.65 or more, more preferably 5.0 or more. The upper limit of the value of relation (1) is not particularly limited, and a larger value is better.

The vulcanized rubber composition also satisfies the following relation (2):

$$(E^*/\tan \delta_2) \geq 21.88 \tag{2}$$

where E* represents the dynamic elastic modulus (E*(MPa)) at 30° C. determined by viscoelastic measurement at an initial strain of 10% and a dynamic strain of 2%, and tan $\delta_2$ represents the tan $\delta$ at 30° C. determined by viscoelastic measurement at an initial strain of 10% and a dynamic strain of 2%.

When the E* and tan $\delta_2$ satisfy relation (2), increased E* and reduced tan $\delta_2$ are obtained so that good handling stability and good fuel economy can be simultaneously achieved. The value of relation (2) is preferably 22 or more, more preferably 25 or more, still more preferably 30 or more, particularly preferably 33 or more. The upper limit of the value of relation (2) is not particularly limited, and a larger value is better.

The vulcanized rubber composition has a tensile elongation (EB (%)) of 600 or more as determined in accordance with JIS K 6251. Namely, it satisfies the following relation (6).

$$EB \geq 600 \tag{6}$$

At least a certain level of tensile elongation leads to excellent fatigue resistance. The EB is preferably 620 or more, more preferably 640 or more, still more preferably 650 or more. The upper limit of the EB is not particularly limited, and a higher EB is better.

The vulcanized rubber composition also satisfies the following relation (7):

$$TB \times EB \geq 12000 \tag{7}$$

where EB represents the tensile elongation (EB (%)) determined in accordance with JIS K 6251, and TB represents the tensile strength at break (TB (MPa)) determined in accordance with JIS K 6251.

At least a certain level of tensile elongation and tensile strength at break lead to excellent tensile strength. The value of relation (7) is preferably 13,000 or more, more preferably 15,000 or more. The upper limit of the value of relation (7) is not particularly limited, and a larger value is better.

The vulcanized rubber composition preferably has a hardness (Hs; type A) at 23° C. of at least 57 but not more than 67 as determined in accordance with JIS K 6253. Namely, it preferably satisfies the following relation (8):

$$57 \leq Hs \leq 67 \tag{8}$$

Such moderate hardness leads to better wet grip performance and better handling stability. When the Hs is less than 57, poor processability or handling stability may be obtained. The Hs is more preferably 66 or less, still more preferably 65 or less, particularly preferably 61 or less. The Hs is also more preferably 58 or more, still more preferably 59 or more.

The predetermined ranges of dynamic elastic modulus and tan $\delta$ at 30° C. as determined by viscoelastic measurement at an initial strain of 10% and a dynamic strain of 2%, the predetermined range of tan $\delta$ at 0° C. as determined by viscoelastic measurement at an initial strain of 10% and a dynamic strain of 5%, and the predetermined ranges of tensile elongation and tensile strength at break as determined in accordance with JIS K 6251, which parameters satisfy all relations (1) to (7) in the vulcanized rubber composition, can be imparted by incorporating a certain rubber component, a certain filler, and/or softeners as described later. The incorporation of a certain rubber component and a certain filler is particularly important.

The following is commonly known: tan $\delta_1$ can be adjusted by varying mainly the type and amount of rubber components; tan $\delta_2$ can be adjusted by varying mainly the type and amount of reinforcing agents (filler); E* can be adjusted by varying mainly the amount of reinforcing agents and softeners; EB can be adjusted by varying mainly the amount of reinforcing agents and softeners; and TB can be adjusted by varying mainly the type and amount of reinforcing agents or rubber components.

The dynamic elastic modulus and tan $\delta$ at 30° C. as determined by viscoelastic measurement at an initial strain of 10% and a dynamic strain of 2%, the tan $\delta$ at 0° C. as determined by viscoelastic measurement at an initial strain of 10% and a dynamic strain of 5%, the tensile elongation and tensile strength at break as determined in accordance with JIS K 6251, and the hardness of the vulcanized rubber composition can be measured by the methods described later in EXAMPLES.

The rubber component of the rubber composition in the present invention preferably includes a modified diene rubber interactive with silica. Examples of the modified diene rubber include: chain end-modified diene rubbers obtained by modifying at least one chain end of a diene rubber with a compound (modifier) containing a functional group interactive with silica; backbone-modified diene rubbers containing the functional group in the backbone; backbone- and chain end-modified diene rubbers containing the functional group in both the backbone and a chain end (e.g., a backbone- and chain end-modified diene rubber in which the backbone contains the functional group and at least one chain end is modified with the modifier); and chain end-modified diene rubbers that have been modified (coupled) with a polyfunctional compound containing two or more epoxy groups in the molecule so that a hydroxyl group or an epoxy group is introduced. The use of such a modified diene rubber provides good fuel economy, wet grip performance, and abrasion resistance.

These modified diene rubbers may be used alone, or two or more of these may be used in combination.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. Preferred among these groups are alkoxy (preferably C1-C6 alkoxy), amino (preferably amino groups in which a hydrogen atom of an amino group is replaced with a C1-C6 alkyl group), alkoxysilyl (preferably C1-C6 alkoxysilyl), hydroxy, and epoxy groups because they are particularly effective in improving fuel economy or wet grip performance.

Examples of the diene rubber into which the functional group is introduced (the polymer forming the skeleton of the modified diene rubber) include natural rubber (NR), polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile butadiene rubber (NBR). Preferred among these are IR, BR, and SBR, with BR or SBR being more preferred. SBR is particularly preferred because it provides a good balance of fuel economy and wet grip performance.

Non-limiting examples of the IR include those commonly used in the tire industry, such as IR2200 available from JSR Corporation and IR2200 available from Zeon Corporation.

Non-limiting examples of the BR include high cis content BR having a cis content of, for example, 90% by mass or more, such as BR1220 available from Zeon Corporation and BR130B and BR150B both available from Ube Industries, Ltd., and BR containing syndiotactic polybutadiene crystals such as VCR412 and VCR617 both available from Ube Industries, Ltd.

Non-limiting examples of the SBR include emulsion-polymerized styrene-butadiene rubber (E-SBR) and solution-polymerized styrene-butadiene rubber (S-SBR).

In the case where the modified diene rubber is a modified SBR, the modified SBR may suitably be a modified SBR obtained by modification with a compound represented by the formula (I) below as disclosed in JP 2010-111753 A. Specific examples include E15 available from Asahi Kasei Chemicals Corporation.

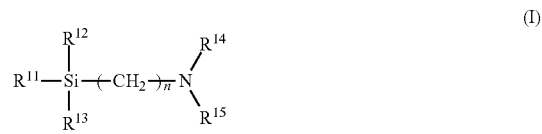

In formula (I), $R^{11}$, $R^{12}$, and $R^{13}$ are the same as or different from one another and each represent an alkyl group, an alkoxy group (preferably a C1-C8, more preferably C1-C4 alkoxy group), a silyloxy group, an acetal group, a carboxyl group (—COOH), a mercapto group (—SH), or a derivative thereof; $R^{14}$ and $R^{15}$ are the same as or different from one another and each represent a hydrogen atom or an alkyl group (preferably a C1-C4 alkyl group); and n represents an integer (preferably of 1 to 5, more preferably 2 to 4, still more preferably 3).

Preferably at least one of $R^{11}$, $R^{12}$, and $R^{13}$ is a C1-C4 alkoxy group. Each of $R^{14}$ and $R^{15}$ is preferably a hydrogen atom or a C1-C4 alkyl group. In such cases, excellent processability and abrasion resistance can be obtained.

Specific examples of the compound of formula (I) include 3-aminopropyltrimethoxysilane, 3-aminopropyltriethoxysilane, 3-aminopropyldimethylmethoxysilane, 3-aminopropyldimethylethoxysilane, 3-aminopropylmethyldimethoxysilane, 2-dimethylaminoethyltrimethoxysilane, 3-diethylaminopropyltrimethoxysilane, and 3-dimethylaminopropyltrimethoxysilane. These may be used alone, or two or more of these may be used in combination.

The modification of styrene-butadiene rubber with the compound (modifier) of formula (I) may be carried out by conventional methods, such as those disclosed in JP H06-53768 B, JP H06-57767 B, and JP 2003-514078 T. For example, the modification may be carried out by bringing styrene-butadiene rubber into contact with the modifier. Specific examples include methods in which, after the preparation of styrene-butadiene rubber by anionic polymerization, a predetermined amount of the modifier is added to the rubber solution to react the polymerizing end (active end) of the styrene-butadiene rubber with the modifier.

The modified SBR preferably has a vinyl content of 10% by mass or more, more preferably 20% by mass or more, still more preferably 30% by mass or more. When the vinyl content is less than 10% by mass, sufficient wet grip performance may not be obtained. The vinyl content is preferably 90% by mass or less, more preferably 80% by mass or less, still more preferably 70% by mass or less. When the vinyl content is more than 90% by mass, strength may deteriorate.

The vinyl content (1,2-butadiene unit content) of SBR as used herein can be determined by infrared absorption spectrometry.

The modified SBR preferably has a styrene content of 5% by mass or more, more preferably 10% by mass or more, still more preferably 20% by mass or more. When the styrene content is less than 5% by mass, sufficient wet grip performance may not be obtained. The styrene content is preferably 70% by mass or less, more preferably 60% by mass or less, still more preferably 50% by mass or less. When the styrene content is more than 70% by mass, processability may deteriorate.

The styrene content of SBR as used herein is determined by $^1$H-NMR analysis.

The modified SBR preferably has a glass transition temperature (Tg) of −45° C. or higher, more preferably −40° C. or higher, still more preferably −35° C. or higher. The glass transition temperature is preferably 10° C. or lower, more preferably 5° C. or lower, still more preferably 0° C. or lower.

The glass transition temperature of SBR as used herein is determined by differential scanning calorimetry (DSC) at a rate of temperature rise of 10° C./min in accordance with JIS K 7121.

The amount of the modified diene rubber based on 100% by mass of the rubber component is preferably 40% by mass or more, more preferably 50% by mass or more, still more preferably 60% by mass or more, particularly preferably 70% by mass or more. When it is less than 40% by mass, wet grip performance may decrease. The amount of the modified diene rubber may be 100% by mass but is preferably 95% by mass or less, more preferably 90% by mass or less, still more preferably 85% by mass or less. When it is more than 95% by mass, fuel economy or abrasion resistance may decrease.

Non-limiting examples of rubber materials other than the modified diene rubber that can be included in the rubber component in the present invention include diene rubbers, excluding the modified diene rubber, such as polyisoprene rubber (IR), polybutadiene rubber (BR), styrene-butadiene rubber (SBR), styrene-isoprene-butadiene rubber (SIBR), ethylene-propylene-diene rubber (EPDM), chloroprene rubber (CR), acrylonitrile butadiene rubber (NBR), butyl rubber (IIR), natural rubber (NR), and epoxidized natural rubber (ENR). These diene rubbers may be used alone, or two or more of these may be used in combination. In order to a good balance of fuel economy, wet grip performance, and abrasion resistance, BR, NR, and SBR are preferred among these, with BR or NR being more preferred, with BR being particularly preferred.

Non-limiting examples of the BR include high cis content BR such as BR1220 available from Zeon Corporation and BR130B and BR150B both available from Ube Industries, Ltd.; and BR containing syndiotactic polybutadiene crystals such as VCR412 and VCR617 both available from Ube Industries, Ltd. In particular, the BR preferably has a cis content of 90% by mass or more, more preferably 95% by mass or more, in order to provide good fuel economy and good abrasion resistance.

The cis content of BR can be measured by infrared absorption spectrometry.

In the case where the rubber component includes BR, the amount of BR based on 100% by mass of the rubber component is preferably 5% by mass or more, more preferably 10% by mass or more, still more preferably 15% by mass or more. The amount is preferably 60% by mass or less, more preferably 40% by mass or less. When the amount is within the range indicated above, abrasion resistance can be dramatically improved.

Non-limiting examples of the NR include those commonly used in the tire industry, such as SIR20, RSS #3, TSR20, deproteinized natural rubber (DPNR), and highly purified natural rubber (HPNR).

In the case where the rubber component includes NR, the amount of NR based on 100% by mass of the rubber component is preferably 10% by mass or more, more preferably 20% by mass or more. The amount is preferably 60% by mass or less, more preferably 40% by mass or less. When the amount is within the range indicated above, abrasion resistance can be dramatically improved.

Any SBR may be used including, for example, emulsion-polymerized styrene-butadiene rubber (E-SBR) and solution-polymerized styrene-butadiene rubber (S-SBR).

In the case where the rubber component includes SBR, the amount of SBR based on 100% by mass of the rubber component is preferably 5% by mass or more, more preferably 10% by mass or more, still more preferably 20% by mass or more. The amount is preferably 60% by mass or less, more preferably 40% by mass or less. When the amount is within the range indicated above, abrasion resistance can be dramatically improved.

The rubber composition in the present invention preferably contains at least one silica. The incorporation of silica together with the modified diene rubber provides excellent fuel economy and excellent rubber strength (fatigue resistance, tensile strength). Non-limiting examples of the silica include dry silica (anhydrous silicic acid) and wet silica (hydrous silicic acid). Wet silica is preferred as it contains a large number of silanol groups.

The silica preferably has a nitrogen adsorption specific surface area ($N_2SA$) of 40 $m^2$/g or more, more preferably 50 $m^2$/g or more. When the $N_2SA$ is less than 40 $m^2$/g, tensile strength after vulcanization tends to decrease. The $N_2SA$ of the silica is also preferably 250 $m^2$/g or less, more preferably 200 $m^2$/g or less. When it is more than 250 $m^2$/g, fuel economy or rubber processability tends to decrease.

The nitrogen adsorption specific surface area of silica is determined by the BET method in accordance with ASTM D3037-93.

The amount of silica per 100 parts by mass of the rubber component is preferably 20 parts by mass or more, more preferably 25 parts by mass or more, still more preferably 45 parts by mass or more. When it is less than 20 parts by mass, the incorporation of silica tends not to produce a sufficient effect. The amount is preferably 150 parts by mass or less, more preferably 120 parts by mass or less, still more preferably 100 parts by mass or less. When it is more than 150 parts by mass, the silica is difficult to disperse in rubber, with the result that rubber processability tends to deteriorate.

In the case where the rubber composition in the present invention contains silica, it preferably contains a silane coupling agent together with the silica.

The silane coupling agent may be any silane coupling agent conventionally used with silica. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3- triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, 2-mercaptoethyltriethoxysilane, and 3-octanoylthio-1-propyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. Examples of commercial products include those sold under the trade names Si69, Si75, and Si363 (all available from Degussa), and NXT, NXT-LV, NXTULV, and NXT-Z (all available from Momentive). Among these, mercapto silane coupling agents are preferred because they provide good fuel economy.

These silane coupling agents may be used alone, or two or more of these may be used in combination.

In the case where the rubber composition in the present invention contains a silane coupling agent, the amount of the silane coupling agent per 100 parts by mass of silica is preferably 0.5 parts by mass or more, more preferably 1.5 parts by mass or more, still more preferably 2.5 parts by mass or more, particularly preferably 5 parts by mass or more. With less than 0.5 parts by mass of the silane coupling agent, it may be difficult to disperse silica well. The amount is preferably 25 parts by mass or less, more preferably 20 parts by mass or less, still more preferably 15 parts by mass or less. When the amount of the silane coupling agent exceeds 25 parts by mass, the effect of improving dispersion of silica tends not to increase, thereby resulting in an unnecessary increase in cost. In addition, scorch time tends to decrease, resulting in reduction in processability during kneading or extrusion.

In addition to silica, the rubber composition in the present invention may contain fillers such as calcium carbonate, talc, alumina, clay, aluminum hydroxide, or mica. Among these, aluminum hydroxide is preferred because then high fuel economy and high wet grip performance can be simultaneously achieved. Namely, a combination of silica and aluminum hydroxide is preferably used in the present invention. In this case, a balanced improvement in fuel economy and wet grip performance can be achieved while enhancing abrasion resistance, handling stability, and rubber strength (fatigue resistance, tensile strength).

Aluminum hydroxide as used herein refers to $Al(OH)_3$ or $Al_2O_3 \cdot 3H_2O$.

These fillers may be used alone, or two or more of these may be used in combination.

The aluminum hydroxide preferably has an average particle size of 10 μm or less, more preferably 5 μm or less, still more preferably 3 μm or less. When the average particle size is more than 10 μm, good wet grip performance may not be obtained. The average particle size is preferably 0.05 μm or more, more preferably 0.1 μm or more. Aluminum hydroxide having an average particle size of less than 0.05 μm is difficult to disperse, with the result that wet grip performance may decrease.

The average particle size of aluminum hydroxide is measured using a transmission or scanning electron microscope. The average particle size refers to a major diameter. The term "major diameter" refers to the longest length obtained when aluminum hydroxide powder is projected onto a plane of projection while varying the orientation of aluminum hydroxide powder relative to the plane of projection.

In the case where the rubber composition in the present invention contains aluminum hydroxide, the amount of aluminum hydroxide per 100 parts by mass of the rubber component is preferably 1 part by mass or more, more preferably 5 parts by mass or more. An amount of less than 1 part by mass may be less effective in improving wet grip performance. The amount of aluminum hydroxide is also preferably 75 parts by mass or less, more preferably 50 parts by mass or less, still more preferably 30 parts by mass or less, particularly preferably 20 parts by mass or less. An amount of more than 75 parts by mass may lead to poor dispersion, with the result that abrasion resistance may deteriorate.

In the case where the rubber composition in the present invention contains aluminum hydroxide, the mass ratio of aluminum hydroxide to silica (aluminum hydroxide (parts by mass)/silica (parts by mass)) is preferably less than 0.3, and more preferably 0.28 or less, still more preferably 0.25 or less. When the mass ratio of aluminum hydroxide to silica is within the range indicated above, a highly balanced improvement in fuel economy and abrasion resistance can be achieved. The lower limit of the mass ratio of aluminum hydroxide to silica (aluminum hydroxide (parts by mass)/silica (parts by mass)) is not particularly limited but is preferably 0.01 or more, more preferably 0.10 or more, still more preferably 0.15 or more.

The rubber composition in the present invention may contain carbon black.

This enhances rubber strength. Non-limiting examples of usable carbon blacks include GPF, FEF, HAF, ISAF, and SAF. These carbon blacks may be used alone, or two or more of these may be used in combination.

The carbon black preferably has a nitrogen adsorption specific surface area ($N_2SA$) of 10 $m^2/g$ or more, more preferably 20 $m^2/g$ or more, still more preferably 70 $m^2/g$ or more. The $N_2SA$ is also preferably 200 $m^2/g$ or less, more preferably 150 $m^2/g$ or less, still more preferably 140 $m^2/g$ or less. Carbon black having a $N_2SA$ of less than 10 $m^2/g$ may not produce a sufficient reinforcing effect, while carbon black having a $N_2SA$ of more than 200 $m^2/g$ tends to reduce fuel economy.

The nitrogen adsorption specific surface area of carbon black is determined by the A method in accordance with JIS K 6217.

In the case where the rubber composition in the present invention contains carbon black, the amount of carbon black per 100 parts by mass of the rubber component is preferably 1 part by mass or more, more preferably 3 parts by mass or more, but preferably 20 parts by mass or less, more preferably 15 parts by mass or less. When the amount of carbon black is within the range indicated above, weather resistance, antistatic properties, and rubber strength can be improved. An amount of less than 1 part by mass tends not to provide sufficient reinforcing properties, while an amount of more than 20 parts by mass may lead to poor fuel economy.

The rubber composition in the present invention may appropriately contain, in addition to the above-described components, compounding agents commonly used in the tire industry, including, for example, softeners such as oil, aromatic petroleum resins, waxes, various antioxidants, stearic acid, zinc oxide, processing aids, vulcanizing agents such as sulfur, and vulcanization accelerators.

Non-limiting examples of softeners which may be used in the present invention include oils such as aromatic mineral oils (viscosity gravity constant (V.G.C.): 0.900 to 1.049), naphthenic mineral oils (V.G.C.: 0.850 to 0.899), and paraffinic mineral oils (V.G.C.: 0.790 to 0.849). The polycyclic aromatic content of the oil is preferably less than 3% by mass, more preferably less than 1% by mass. The polycyclic aromatic content is measured in accordance with the Institute of Petroleum (IP, U.K.) 346/92 method. The aromatic content (CA) of the oil is preferably 20% by mass or more.

Other examples of softeners include liquid polymers (liquid diene polymers), liquid resins, vegetable oils, and ester plasticizers.

These softeners may be used alone, or two or more of these may be used in combination.

In the case where the rubber composition in the present invention contains a softener, the amount of the softener per 100 parts by mass of the rubber component is preferably 1 part by mass or more, more preferably 5 parts by mass or more, still more preferably 10 parts by mass or more, in order to more suitably achieve the effects of the present invention. The amount is also preferably 40 parts by mass or less, more preferably 35 parts by mass or less, still more preferably 30 parts by mass or less, per 100 parts by mass of the rubber component.

In order to suitably achieve the effects of the present invention, an aromatic petroleum resin is preferably incorporated in the present invention. Examples of the aromatic petroleum resin include phenolic resins, coumarone-indene resins, styrene resins, rosin resins, and DCPD resins. These aromatic petroleum resins may be used alone, or two or more of these may be used in combination.

In order to more suitably achieve the effects of the present invention, styrene resins are preferred among these. More preferred are aromatic vinyl polymers obtained by polymerization of α-methylstyrene and/or styrene.

The aromatic vinyl polymer may be a homopolymer of styrene or α-methylstyrene as an aromatic vinyl monomer (unit) or a copolymer of both monomers. The aromatic vinyl polymer is preferably a homopolymer of α-methylstyrene or a copolymer of α-methylstyrene and styrene because they are economical, readily processable, and excellent in wet grip performance.

The aromatic petroleum resin preferably has a softening point of 70° C. or higher, more preferably 80° C. or higher. When the softening point is lower than 70° C., wet grip performance tends to deteriorate. The softening point is also preferably 140° C. or lower, more preferably 120° C. or lower, still more preferably 100° C. or lower. When it is higher than 140° C., abrasion resistance or wet grip performance tends to deteriorate.

The softening point of the aromatic petroleum resin is determined in accordance with JIS K 6220-1:2001 using a ring and ball softening point measuring apparatus and is defined as the temperature at which the ball drops down.

The aromatic petroleum resin preferably has a weight average molecular weight (Mw) of 500 or more, more preferably 800 or more. An aromatic petroleum resin having a Mw of less than 500 tends not to be sufficiently effective in improving wet grip performance. The weight average molecular weight of the aromatic petroleum resin is also preferably 3,000 or less, more preferably 2,000 or less. When it is more than 3,000, abrasion resistance tends to deteriorate.

The weight average molecular weight of the aromatic petroleum resin can be determined by gel permeation chromatography (GPC) (GPC-8000 series available from Tosoh Corporation, detector: differential refractometer, column: TSKGEL SUPERMALTPORE HZ-M available from Tosoh Corporation) calibrated with polystyrene standards.

In the case where the rubber composition in the present invention contains an aromatic petroleum resin, the amount of the aromatic petroleum resin per 100 parts by mass of the rubber component is preferably 2 parts by mass or more, more preferably 5 parts by mass or more, still more preferably 7 parts by mass or more. An amount of less than 2 parts by mass may not be sufficiently effective in improving wet grip performance. The amount is also preferably 25 parts by mass or less, more preferably 20 parts by mass or less. When it is more than 25 parts by mass, sufficient wet grip performance may not be obtained. In addition, temperature dependence tends to increase so that larger changes in properties are obtained relative to changes in temperature, with the result that, for example, heat sag resistance tends to decrease.

Non-limiting examples of antioxidants which may be used in the present invention include naphthylamine antioxidants, quinoline antioxidants, diphenylamine antioxidants, p-phenylenediamine antioxidants, hydroquinone derivative antioxidants, phenol (monophenol, bisphenol, trisphenol, polyphenol) antioxidants, thiobisphenol antioxidants, benzimidazole antioxidants, thiourea antioxidants, phosphite antioxidants, and organic thioacid antioxidants.

Examples of naphthylamine antioxidants include phenyl-α-naphthylamine, phenyl-β-naphthylamine, and aldol-α-trimethyl-1,2-naphthylamine.

Examples of quinoline antioxidants include 2,2,4-trimethyl-1,2-dihydroquinoline polymer and 6-ethoxy-2,2,4-trimethyl-1,2-dihydroquinoline.

Examples of diphenylamine antioxidants include p-isopropoxydiphenylamine, p-(p-toluenesulfonylamide)-diphenylamine, N,N-diphenylethylenediamine, and octylated diphenylamine.

Examples of p-phenylenediamine antioxidants include N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamines, hindered diaryl-p-phenylenediamines, phenylhexyl-p-phenylenediamine, and phenyloctyl-p-phenylenediamine.

Examples of hydroquinone derivative antioxidants include 2,5-di-(tert-amyl)hydroquinone and 2,5-di-tert-butylhydroquinone.

With regard to phenol antioxidants, examples of monophenol antioxidants include 2,6-di-tert-butyl-4-methylphenol, 2,6-di-tert-butyl-4-ethylphenol, 2,6-di-tert-butylphenol, 1-oxy-3-methyl-4-isopropylbenzene, butylhydroxyanisole, 2,4-dimethyl-6-tert-butylphenol, n-octadecyl-3-(4'-hydroxy-3',5'-di-tert-butylphenyl)-propionate, and styrenated phenol. Examples of bisphenol, trisphenol, and polyphenol antioxidants include 2,2'-methylene-bis(4-methyl-6-tert-butylphenol), 2,2'-methylene-bis(4-ethyl-6-tert-butylphenol), 4,4'-butylidene-bis(3-methyl-6-tert-butylphenol), 1,1'-bis(4-hydroxyphenyl)cyclohexane, and tetrakis[methylene-3-(3',5'-di-tert-butyl-4'-hydroxyphenyl) propionate]methane.

Examples of thiobisphenol antioxidants include 4,4'-thiobis(6-tert-butyl-3-methylphenol) and 2,2'-thiobis(6-tert-butyl-4-methylphenol). Examples of benzimidazole antioxidants include 2-mercaptomethyl-benzimidazole. Examples of thiourea antioxidants include tributylthiourea. Examples of phosphite antioxidants include tris(nonylphenyl)phosphite. Examples of organic thioacid antioxidants include dilauryl thiodipropionate. These antioxidants may be used alone, or two or more of these may be used in combination.

In order to more suitably achieve the effects of the present invention, a combination of a quinoline antioxidant and a p-phenylenediamine antioxidant is preferably used. In the case where the rubber composition in the present invention contains an antioxidant, the amount of the antioxidant (the combined amount of two or more antioxidants, if used) per 100 parts by mass of the rubber component is preferably 1 to 10 parts by mass, more preferably 3 to 7 parts by mass.

The rubber composition in the present invention preferably contains zinc oxide. This facilitates cure so that rigidity and isotropy of physical properties can be obtained. Any zinc oxide may be used including those conventionally used in the rubber industry, such as Ginrei R available from Toho Zinc Co., Ltd. and zinc oxide available from Mitsui Mining & Smelting Co., Ltd., and finely divided zinc oxide having an average particle size of 200 nm or less, such as ZINCOX SUPER F-2 available from HakusuiTech Co., Ltd. These types of zinc oxide may be used alone, or two or more of these may be used in combination.

In the case where the rubber composition in the present invention contains zinc oxide, the amount of zinc oxide per 100 parts by mass of the rubber component is preferably 1.0 part by mass or more, more preferably 1.5 parts by mass or more. When it is less than 1.0 part by mass, sufficient hardness (Hs) may not be obtained due to reversion. The amount is preferably 3.7 parts by mass or less, more preferably 3.0 parts by mass or less. When it is more than 3.7 parts by mass, tensile strength may be more likely to decrease.

Suitable examples of the vulcanizing agent include, but are not limited to, sulfur and alkylphenol-sulfur chloride condensates, with sulfur being preferred.

These vulcanizing agents may be used alone, or two or more of these may be used in combination.

The amount of the vulcanizing agent per 100 parts by mass of the rubber component is preferably 0.1 parts by mass or more, more preferably 0.3 parts by mass or more. The amount of the vulcanizing agent is preferably 7 parts by mass or less, more preferably 5 parts by mass or less. When it is adjusted within the range indicated above, the effects of the present invention can be more suitably achieved.

Examples of the vulcanization accelerator include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine vulcanization accelerators, aldehyde-ammonia vulcanization accelerators, imidazoline vulcanization accelerators, and xanthate vulcanization accelerators. These vulcanization accelerators may be used alone, or two or more of these may be used in combination. In order to more suitably achieve the effects of the present invention, sulfenamide and guanidine vulcanization accelerators are preferred among these, with combinations of sulfenamide and guanidine vulcanization accelerators being more preferred.

Examples of sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DCBS).

Examples of guanidine vulcanization accelerators include diphenylguanidine, diorthotolylguanidine, and orthotolylbiguanidine.

The amount of the vulcanization accelerator (the combined amount of two or more vulcanization accelerators, if used) per 100 parts by mass of the rubber component is preferably 0.1 parts by mass or more, more preferably 0.5 parts by mass or more, still more preferably 1 part by mass or more. The amount of the vulcanization accelerator is preferably 10 parts by mass or less, more preferably 8 parts by mass or less, still more preferably 6 parts by mass or less. When it is adjusted within the range indicated above, the effects of the present invention can be more suitably achieved.

The rubber composition in the present invention may be prepared by known methods, such as by kneading the above-described components using a rubber kneading machine such as an open roll mill or Banbury mixer and vulcanizing the mixture.

The pneumatic tire of the present invention can be formed from the rubber composition by usual methods. Specifically, the rubber composition containing the components, before vulcanization, is extruded and processed into the shape of a tread and then assembled with other tire components on a tire building machine in a usual manner to build an unvulcanized tire. The unvulcanized tire is heat pressed in a vulcanizer to produce a tire.

The pneumatic tire of the present invention can be suitably used for passenger vehicles, trucks and buses, two-wheeled vehicles, racing vehicles, and other vehicles, especially for passenger vehicles.

EXAMPLES

The present invention will be specifically described below with reference to, but not limited to, examples.

The chemicals used in the examples are listed below.

SBR 1: modified SBR (modified S-SBR, S-SBR terminally modified with a compound of formula (I) where $R^{11}$ is a methoxy group, $R^{12}$ is a methoxy group, $R^{13}$ is a methoxy group, $R^{14}$ is an ethyl group, $R^{15}$ is an ethyl group, and n is 3; styrene content: 25% by mass, vinyl content: 57% by mass, Tg: −25° C.) available from Sumitomo Chemical Co., Ltd.

SBR 2: Nipol 1502 (non-modified SBR, styrene content: 24.5% by mass, vinyl content: 15.1% by mass, Tg: −52° C.) available from Zeon Corporation BR: Ubepol BR150B (cis content: 96% by mass) available from Ube Industries, Ltd.

Silica: ULTRASIL VN3 ($N_2SA$: 175 m$^2$/g) available from Evonik Degussa

Carbon black: DIABLACK N220 (ISAF, $N_2SA$: 114 m$^2$/g) available from Mitsubishi Chemical Corporation Aluminum hydroxide: Apyral 200SM (average particle size: 0.6 μm) available from Nabaltec Silane coupling agent: NXT (3-octanoylthio-1-propyltriethoxysilane) available from Momentive Oil: X-140 available from JX Nippon Oil & Energy Corporation Resin: SYLVARES SA85 (a copolymer of α-methylstyrene and styrene (aromatic vinyl polymer), softening point: 85° C., Mw: 1,000) available from Arizona Chemical Wax: SUNNOC N available from Ouchi Shinko Chemical Industrial Co., Ltd.

Antioxidant 1: NOCRAC 6C (N-(1,3-dimethylbutyl)-N'-phenyl-p-phenylenediamine) available from Ouchi Shinko Chemical Industrial Co., Ltd.

Antioxidant 2: NOCRAC 224 (2,2,4-trimethyl-1,2-dihydroquinoline polymer) available from Ouchi Shinko Chemical Industrial Co., Ltd.

Stearic acid: stearic acid "TSUBAKI" available from NOF Corporation

Zinc oxide: zinc oxide #2 available from Mitsui Mining & Smelting Co., Ltd.

Sulfur: powdered sulfur available from Tsurumi Chemical Industry Co., Ltd.

Vulcanization accelerator 1: NOCCELER NS (N-tert-butyl-2-benzothiazolylsulfenamide) available from Ouchi Shinko Chemical Industrial Co., Ltd.

Vulcanization accelerator 2: Soxinol D (diphenylguanidine) available from Sumitomo Chemical Co., Ltd.

Examples and Comparative Examples

According to each of the formulations shown in Table 1, the materials other than the sulfur and vulcanization accelerators were kneaded at 150° C. for five minutes using a 1.7 L Banbury mixer (available from Kobe Steel, Ltd.) to obtain a kneadate. Then, to the kneadate were added the sulfur and vulcanization accelerators, and they were kneaded at 80° C. for five minutes using an open roll mill to obtain an unvulcanized rubber composition. The unvulcanized rubber composition was press-vulcanized using a 0.5 mm-thick mold at 150° C. for 30 minutes to obtain a vulcanized rubber composition. Separately, the unvulcanized rubber composition was formed into a tread and assembled with other tire components on a tire building machine, followed by vulcanization at 150° C. for 30 minutes to prepare a test tire (size: 195/65R15).

The vulcanized rubber compositions and test tires prepared as above were evaluated for the following items. Table 1 shows the results.

(Viscoelastic Measurement)

The dynamic elastic modulus (E*(MPa)) and loss tangent (tan δ) of the vulcanized rubber compositions were measured using a viscoelastic spectrometer VES (available from Iwamoto Seisakusho Co., Ltd.) under conditions including a temperature of 0° C., a frequency of 10 Hz, an initial strain of 10%, and a dynamic strain of 5%, or under conditions including a temperature of 30° C., a frequency of 10 Hz, an initial strain of 10%, and a dynamic strain of 2%. The values of the following relations (1) to (5) were calculated from the measurements.

$$(\tan \delta_1/\tan \delta_2) \geq 4.38 \tag{1}$$

$$(E^*/\tan \delta_2) \geq 21.88 \tag{2}$$

$$3.5 \leq E^* \leq 6.0 \tag{3}$$

$$\tan \delta_2 \leq 0.16 \tag{4}$$

$$\tan \delta_1 \geq 0.70 \tag{5}$$

The tan $\delta_1$ in relations (1) and (5) represents the tan at 0° C. determined by viscoelastic measurement at an initial strain of 10% and a dynamic strain of 5%. The tan $\delta_2$ in relations (1), (2), and (4) represents the tan δ at 30° C. determined by viscoelastic measurement at an initial strain of 10% and a dynamic strain of 2%. The E* in relations (2) and (3) represents the dynamic elastic modulus (E*(MPa)) at 30° C. determined by viscoelastic measurement at an initial strain of 10% and a dynamic strain of 2%.

(Tensile Test)

No. 3 dumbbell-shaped test pieces prepared from the vulcanized rubber compositions were subjected to a tensile test in accordance with JIS K 6251 "Rubber, vulcanized or thermoplastic—Determination of tensile stress-strain properties" to measure the elongation at break (tensile elongation; EB (%)) and tensile strength at break (tensile breaking strength; TB (MPa)) of the vulcanized rubber compositions. The values of the following relations (6) and (7) were calculated from the measurements. Larger values of relations (6) and (7) indicate better fatigue resistance and better tensile strength.

$$EB \geq 600 \tag{6}$$

$$TB \times EB \geq 12000 \tag{7}$$

The EB in relations (6) and (7) represents the tensile elongation (EB (%)) determined in accordance with JIS K 6251. The TB in relation (7) represents the tensile strength at break (TB (MPa)) determined in accordance with JIS K 6251.

(Hardness)

The hardness (Hs) at 23° C. of rubber specimens (the vulcanized rubber compositions) was measured using a type A durometer in accordance with JIS K 6253 "Rubber, vulcanized or thermoplastic—Determination of hardness".

(Fuel Economy)

The rolling resistance of each test tire was determined by running the test tire on a rolling resistance tester with a rim (15×6 JJ) at an internal pressure of 230 kPa, a load of 3.43 kN, and a speed of 80 km/h. The results are expressed as an index, with Comparative Example 1 set equal to 100. A higher index is better (better fuel economy).

(Wet Grip Performance)

Each set of test tires was mounted on all the wheels of a front-engine, front-wheel-drive car of 2,000 cc displacement made in Japan. The braking distance of the car with an initial speed of 100 km/h under wet asphalt road conditions was determined. The results are expressed as an index. A higher index indicates better wet skid performance (wet grip performance). The index was determined using the following equation.

(Wet skid performance)=(Braking distance of Comparative Example 1)/(Braking distance of each formulation example)×100

(Handling Stability)

Each set of test tires was mounted on all the wheels of a front-engine, front-wheel-drive car of 2,000 cc displacement made in Japan. A driver drove the car in a zig-zag fashion on a test track and subjectively evaluated the handling stability. The driver also evaluated the handling stability immediately after the start of the test and 30 minutes later. The overall handling stability results were rated relative to Comparative Example 1, which was assigned a score of 100. A higher score indicates better handling stability.

(Abrasion Resistance)

Each set of test tires was mounted on all the wheels of a front-engine, front-wheel-drive car of 2,000 cc displacement made in Japan, which was then driven for 35,000 km. The changes in the depth of the pattern grooves before and after the 35,000 km drive were determined. The results are expressed as an index, with Comparative Example 1 set equal to 100. A higher index indicates better abrasion resistance.

TABLE 1

| | | Example 1 | Example 2 | Comparative Example 1 | Comparative Example 2 |
|---|---|---|---|---|---|
| Formulation (parts by mass) | SBR 1 | 85 | 80 | — | — |
| | SBR 2 | — | — | 85 | 100 |
| | BR | 15 | 20 | 15 | — |
| | Silica | 55 | 50 | 70 | 70 |
| | Carbon black | 5 | 5 | 5 | 5 |
| | Aluminum hydroxide | 15 | 10 | — | — |
| | Silane coupling agent | 5.5 | 5 | 7 | 7 |
| | Oil | 15 | 10 | 20 | 20 |
| | Resin | 10 | 7.5 | 5 | — |
| | Wax | 2 | 2 | 2 | 2 |
| | Antioxidant 1 | 2.5 | 2.5 | 2.5 | 2.5 |
| | Antioxidant 2 | 1 | 1 | 1 | 1 |
| | Stearic acid | 2 | 2 | 1.5 | 1.5 |
| | Zinc oxide | 2.5 | 2.5 | 2.5 | 2.5 |
| | Sulfur | 1.5 | 1.5 | 1.5 | 1.5 |
| | Vulcanization accelerator 1 | 1.5 | 1.5 | 1.5 | 1.5 |
| | Vulcanization accelerator 2 | 2.5 | 2.5 | 2.5 | 2.5 |
| Rubber properties | Value of Formula (1) | 5.36 | 5.68 | 2.59 | 2.74 |
| | Value of Formula (2) | 34.29 | 35.20 | 27.57 | 27.89 |
| | Value of Formula (3) | 4.8 | 4.4 | 5.1 | 5.3 |
| | Value of Formula (4) | 0.140 | 0.125 | 0.185 | 0.190 |
| | Value of Formula (5) | 0.75 | 0.71 | 0.48 | 0.52 |
| | Value of Formula (6) | 650 | 675 | 575 | 560 |
| | Value of Formula (7) | 16,000 | 13,500 | 11,000 | 10,000 |
| | Hardness (Hs) | 60 | 60 | 62 | 63 |
| Tire performance | Fuel economy | 110 | 115 | 100 | 98 |
| | Wet grip performance | 112 | 109 | 100 | 102 |
| | Handling stability | 110 | 108 | 100 | 103 |
| | Abrasion resistance | 110 | 113 | 100 | 92 |

The tires of the examples each using in a tread a rubber composition having after vulcanization predetermined levels of tan δ, E*, EB, and TB were found to achieve a balanced improvement in fuel economy, wet grip performance, handling stability, abrasion resistance, fatigue resistance, and tensile strength.

The desired properties were obtained particularly in the examples where a combination of silica and aluminum hydroxide at a predetermined ratio and a certain SBR were used.

In contrast, when the above components were not used, the vulcanized compositions did not have the predetermined levels of properties, thus resulting in inferior performance.

The invention claimed is:

1. A pneumatic tire, comprising a tread formed from a rubber composition,
   the rubber composition including an aromatic petroleum resin,
   the rubber composition including a quinoline antioxidant and a p-phenylenediamine antioxidant, and
   the rubber composition having after vulcanization rubber properties satisfying all the following relations (1) to (7):

$$(\tan \delta_1 / \tan \delta_2) \geq 4.38 \quad (1)$$

$$(E^* / \tan \delta_2) \geq 21.88 \quad (2)$$

$$3.5 \leq E^* \leq 6.0 \quad (3)$$

$$\tan \delta_2 \leq 0.16 \quad (4)$$

$$\tan \delta_1 \geq 0.70 \quad (5)$$

$$EB \geq 600 \quad (6)$$

$$TB \times EB \geq 12000 \quad (7)$$

where $\tan \delta_1$ in relations (1) and (5) represents a tan δ at 0° C. determined by viscoelastic measurement at an initial strain of 10% and a dynamic strain of 5%; $\tan \delta_2$ in relations (1), (2), and (4) represents a tan δ at 30° C. determined by viscoelastic measurement at an initial strain of 10% and a dynamic strain of 2%; E* in relations (2) and (3) represents a dynamic elastic modulus (E* (MPa)) at 30° C. determined by viscoelastic measurement at an initial strain of 10% and a dynamic strain of 2%; EB in relations (6) and (7) represents a tensile elongation (EB (%)) determined in accordance with JIS K 6251; and TB in relation (7) represents a tensile strength at break (TB (MPa)) determined in accordance with JIS K 6251.

2. The pneumatic tire according to claim 1,
   wherein the rubber properties after vulcanization of the rubber composition further satisfy the following relation (8):

$$57 \leq Hs \leq 67 \quad (8)$$

where Hs represents a hardness (Hs) at 23° C. determined in accordance with JIS K 6253.

3. The pneumatic tire according to claim 1,
   wherein the rubber composition includes a styrene-butadiene rubber modified by a compound represented by formula (I):

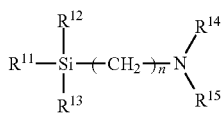
(I)

wherein $R^{11}$, $R^{12}$, and $R^{13}$ are the same as or different from one another and each represent an alkyl group, an alkoxy group, a silyloxy group, an acetal group, a carboxyl group, a mercapto group, or a derivative thereof; $R^{14}$ and $R^{15}$ are the same as or different from one another and each represent a hydrogen atom or an alkyl group; and n represents an integer.

4. The pneumatic tire according to claim 3,
wherein the modified styrene-butadiene rubber has a vinyl content of 10 to 90% by mass.

5. The pneumatic tire according to claim 3,
wherein the modified styrene-butadiene rubber has a styrene content of 5 to 70% by mass.

6. The pneumatic tire according to claim 3,
wherein the modified styrene-butadiene rubber has a glass transition temperature of −45 to 10° C.

7. The pneumatic tire according to claim 3,
wherein an amount of the modified styrene-butadiene rubber is 70 to 95% by mass based on 100% by mass of a rubber component.

8. The pneumatic tire according to claim 1,
wherein the rubber composition includes aluminum hydroxide.

9. The pneumatic tire according to claim 8,
wherein the aluminum hydroxide has an average particle size of 0.05 to 10 μm.

10. The pneumatic tire according to claim 8,
wherein an amount of the aluminum hydroxide is 1 to 75 parts by mass per 100 parts by mass of a rubber component.

11. The pneumatic tire according to claim 8,
wherein the rubber composition further includes silica, wherein a mass ratio of the aluminum hydroxide to the silica is 0.01 to 0.28.

12. The pneumatic tire according to claim 1,
wherein the aromatic petroleum resin has a softening point of 70 to 140° C.

13. The pneumatic tire according to claim 1,
wherein the aromatic petroleum resin has a weight average molecular weight of 500 to 3000.

14. The pneumatic tire according to claim 1,
wherein an amount of the aromatic petroleum resin is 2 to 25 parts by mass per 100 parts by mass of a rubber component.

15. The pneumatic tire according to claim 1,
wherein the rubber composition includes a sulfenamide vulcanization accelerator and a guanidine vulcanization accelerator.

16. The pneumatic tire according to claim 15,
wherein a combined amount of the sulfenamide vulcanization accelerator and the guanidine vulcanization accelerator is 1 to 10 parts by mass per 100 parts by mass of a rubber component.

17. A pneumatic tire, comprising a tread formed from a rubber composition,
the rubber composition including a quinoline antioxidant and a p-phenylenediamine antioxidant, and
the rubber composition having after vulcanization rubber properties satisfying all the following relations (1) to (7):

$(\tan \delta_1 / \tan \delta_2) \geq 4.38$ (1)

$(E^*/\tan \delta_2) \geq 21.88$ (2)

$3.5 \leq E^* \leq 6.0$ (3)

$\tan \delta_2 \leq 0.16$ (4)

$\tan \delta_1 \geq 0.70$ (5)

$EB \geq 600$ (6)

$TB \times EB \geq 12000$ (7)

where $\tan \delta_1$ in relations (1) and (5) represents a tan δ at 0° C. determined by viscoelastic measurement at an initial strain of 10% and a dynamic strain of 5%; $\tan \delta_2$ in relations (1), (2), and (4) represents a tan δ at 30° C. determined by viscoelastic measurement at an initial strain of 10% and a dynamic strain of 2%; $E^*$ in relations (2) and (3) represents a dynamic elastic modulus ($E^*$ (MPa)) at 30° C. determined by viscoelastic measurement at an initial strain of 10% and a dynamic strain of 2%; EB in relations (6) and (7) represents a tensile elongation (EB (%)) determined in accordance with JIS K 6251; and TB in relation (7) represents a tensile strength at break (TB (MPa)) determined in accordance with JIS K 6251.

18. The pneumatic tire according to claim 17,
wherein a combined amount of the quinoline antioxidant and the p-phenylenediamine antioxidant is 1 to 10 parts by mass per 100 parts by mass of a rubber component.

* * * * *